United States Patent [19]

Tatarchuk et al.

[11] Patent Number: 4,804,527
[45] Date of Patent: Feb. 14, 1989

[54] METHOD AND COMPOSITION FOR SAFELY DECOMPOSING HYDRAZINE

[75] Inventors: Bruce J. Tatarchuk, Auburn, Ala.; Rasik H. Raythatha, Tennille, Ga.

[73] Assignee: E.C.C. America Inc., Atlanta, Ga.

[21] Appl. No.: 875,274

[22] Filed: Jun. 17, 1986

[51] Int. Cl.$^4$ .............................................. C01B 21/00
[52] U.S. Cl. ................................ 423/351; 423/648.1; 502/60; 502/80; 502/184; 502/244; 502/345; 502/346
[58] Field of Search ................... 502/60, 80, 184, 244, 502/345, 346; 423/351, 648 R

[56] References Cited

U.S. PATENT DOCUMENTS

| | | | |
|---|---|---|---|
| 1,956,585 | 5/1934 | Oglesby et al. | 423/351 |
| 2,926,144 | 2/1960 | Plescia et al. | 423/648 R |
| 2,930,184 | 3/1960 | Plescia et al. | 423/648 R |
| 2,988,430 | 6/1961 | Horner | 423/648 R |
| 3,165,382 | 1/1965 | Forte | 423/351 |
| 4,419,273 | 12/1983 | Santilli et al. | 502/80 |
| 4,442,223 | 4/1984 | Chester et al. | 502/80 |
| 4,601,997 | 7/1986 | Speronello | 502/80 |

FOREIGN PATENT DOCUMENTS

| | | | |
|---|---|---|---|
| 635739 | 1/1962 | Canada | 423/351 |
| 1957423 | 5/1971 | Fed. Rep. of Germany | 423/351 |
| 1534879 | 8/1968 | France | 423/351 |
| 930499 | 7/1963 | United Kingdom | 423/351 |

OTHER PUBLICATIONS

W. J. Ward et al., *Ammonia Plant Safety*, vol. 21, 57 (1979).
L. F. Audrieth et al., *The Chemistry of Hydrazine*, pp. 138–139, 148–152, John Wiley, New York (1951).
A. J. Clark et al., *Journal of Inorganic Nuclear Chemistry*, vol. 29, 836–838 (1967).
M. W. Rophael, *Surface Technology*, vol. 16, 235–42 (1982) (Eng.) abstracted in *Chemical Abstracts*, vol. 97, 134119h (1982).
Japanese Kokai 7895894 to Toshio Aibe, (Takeda Chemical Industries Ltd.) Aug. 22, 1978, Appl. 77/11272, Feb. 3, 1977, abstracted in *Chemical Abstracts*, vol. 90, 12909 (1979).
D. W. Johnson et al., *Journal of Electron Spectroscopy and Related Phenomena*, vol. 19, 185–196 (1980).
M. Szwarc, Proceedings of the Royal Society, (London), vol. A 198, 267–284 (1949).
J. P. Contour et al., *Journal of Catalysts*, vol. 24, 434–445 (1972).

*Primary Examiner*—John Doll
*Assistant Examiner*—Wayne A. Langel
*Attorney, Agent, or Firm*—Stefan J. Klauber

[57] ABSTRACT

A hypergol spill, e.g., hydrazine, is safely rendered harmless by contacting it with a composition comprising cupric oxide on a porous support. Neutralization is achieved by drawing the hydrazine into the pellet pores where a reduction reaction of cupric oxide takes place. The critical consideration is to avoid flashing or spontaneous thermal decomposition of the hydrazine. Heat of reaction is quenched by the heat capacity of the pellet and water dilution.

10 Claims, 4 Drawing Sheets

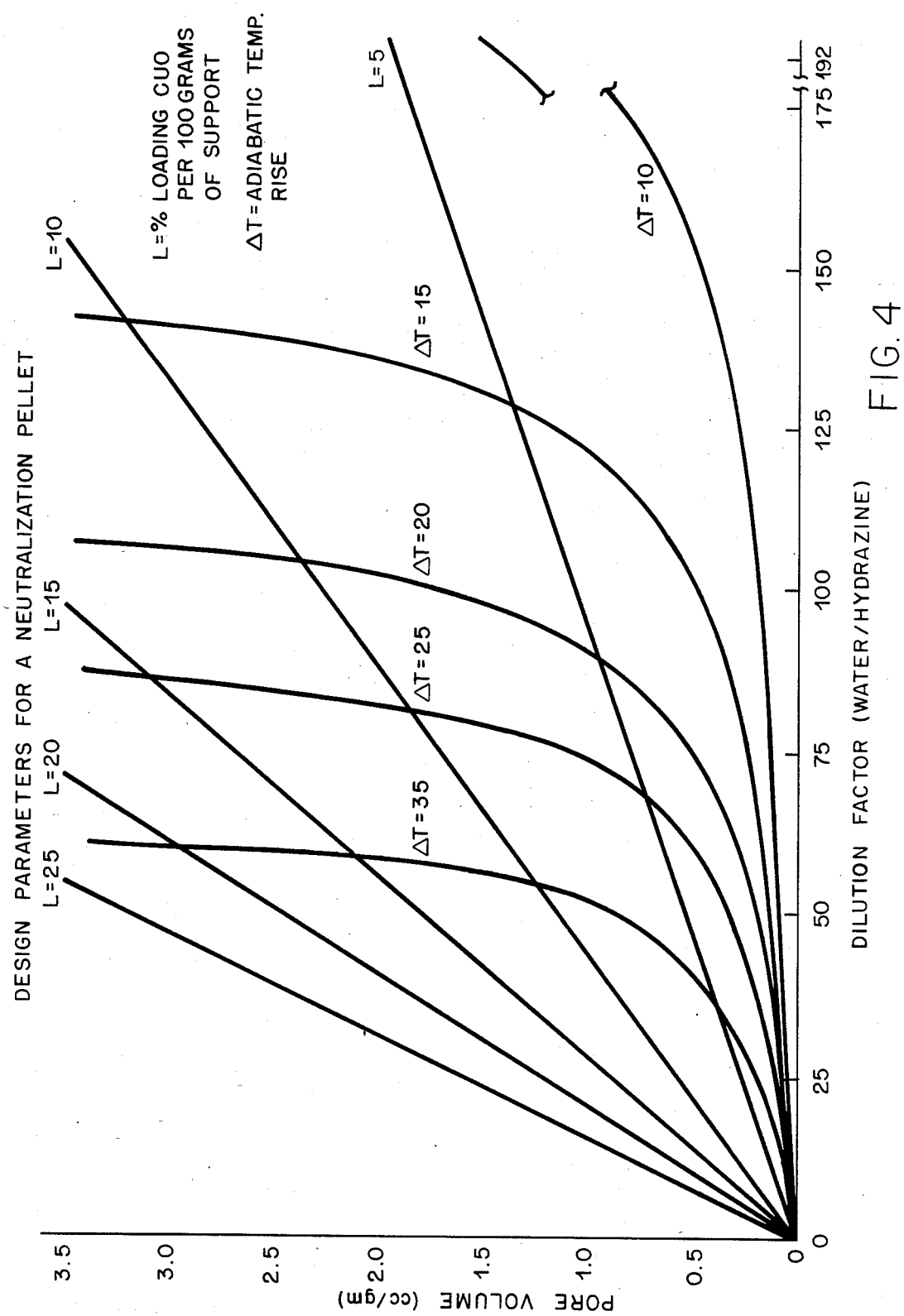

METHOD AND COMPOSITION FOR SAFELY DECOMPOSING HYDRAZINE

FIELD OF THE INVENTION

This invention relates to a method and composition for safety decomposing/neutralizing (in the sense of rendering harmless) hypergolic substances, the term "hypergolic" meaning igniting spontaneously upon contact with a complementary substance. The latter may be air, oxygen, organics, metals, metal oxides, e.g., rust, etc. More particularly, the invention relates to a method that can be applied to an unwanted liquid hydrazine spill, or a derivative thereof having similar properties, for the purpose of absorbing and safely neutralizing the fluid with subsequent disposal involving no special protective measures.

In handling and distribution processing of hydrazine, the generation of unwanted liquid spills occurs during actual use or during maintenance operations, transfers, and venting. There is a need for a material that can be quickly applied to any surface (steel, plastic, concrete) that will dispose of the hydrazine such that its application will reduce evaporation of the fluid, react/neutralize in a controlled nonviolent manner (no fire, explosion, high heat, or corrosive reaction), and reduce its toxicity to a level where disposal can be safely accomplished without special protective measures, all of these being included in the objects of the invention.

BACKGROUND OF THE INVENTION

An important use of hydrazine is as a rocket fuel. It is also used industrially to remove chromates from waste water which may be present from operations involving metal plating, chemical pigments, leather tanning or textiles. Hydrazine can be used to reduce heavy metal ions in order to (i) make them insoluble so as to recover them from waste streams, and (ii) to assist electroless plating operations. One of its earliest uses was the reduction of ferric oxide in boilers but it is now known to reduce many metal ions to lower valence states or even to the metals themselves.

As is already apparent, hydrazine is a very reactive material. It undergoes reactions with many compounds, in many instances yielding products which themselves are explosive, hence which are not promising as a possible neutralizing mechanism.

Included in the known reactions, transition metal oxides (TMO's), e.g. first row (of the Periodic Table) TMO's are known to be easily reduced by hydrazine with the resulting formation of safe, non-toxic products, see W. J. Ward et al, *Ammonia Plant Society*, Vol. 21, 57 (1979); L. F. Audrieth et al, "*The Chemistry of Hydrazine*", pp. 138–139, 148–152, John Wiley, New York (1951); A. J. Clark et al, *J. Inorg. Nucl. Chem.*, Vol. 29, 836–838 (1967); M. W. Rophael, *Surf. Technology*, Vol. 16, 235–42 (1982) (Eng.) abstracted in *Chemical Abstracts*, Vol. 97, 134199 h (1982).

In Japanese Kokai No. 7895849 to Toshio Aibe, (Takeda Chemical Industries, Ltd.) Aug. 22, 1978, Appl. 77/11272, Feb. 3, 1977, abstracted in *Chemical Abstracts*, Vol. 90, 12909 (1979), a catalyst is disclosed for decomposing $N_2H_4$ consisting of sulfates or halides of metals including Cr, Mn, Cu, etc. and a support such as bentonite.

Photoemission studies also indicate that hydrazine can be strongly bonded to Al, to $SiO_2$ surfaces and to a $Pt/Al_2O_3$ catalyst. This strong bonding can be attributed to hydrazine's Lewis basicity from the nonbonding electron pairs on the nitrogen atoms having significant affinity for acid sites, see D. W. Johnson et al, *Journal of Electron Spectroscopy and Related Phenomena*, Vol. 19, 185–196 (1980); M. Szwarc, *Proceedings of the Royal Society* (London), Vol. A 198, 267–284 (1949); J. P. Contour et al, *Journal of Catalysis*, Vol. 24, 434–445 (1972).

However, it is not predictable—owing to the complexity of the problem as discussed in detail hereinafter—which treatments or reactions proceed in such manner, or can readily be controlled, as to accomplish the aforesaid object of achieving a safe, innocuous neutralization mechanism. The prior art has not disclosed the present scheme for accomplishing this.

SUMMARY OF THE INVENTION

It has now been found that a method for safely decomposing a hypergolic substance, e.g. hydrazine, comprises contacting it with a composition comprising a copper oxide supported on a substantially inert (towards hydrazines) porous material. The reaction that takes place is reduction of the copper oxide by the hydrazine. Surprisingly, cupric oxide is by far the most easily reduced oxide in a series of transition metal oxides tested. The composition itself, and its mode of preparation, are novel and the support may suitably be selected from the group consisting of silica-containing materials, silica-alumina-containing materials, natural and synthetic zeolites, natural and synthetic mineral clays, high surface area metal oxides and high surface area carbons. The support may, if desired, be pretreated by surface modification to reduce acidity. The composition may conveniently be prepared in the form of pellets. A typical example of such composition is a copper oxide which may be $Cu_2O$ or $CuO$ or a mixture thereof, preferably $CuO$, supported on kaolin. The need for the composition can arise when a hydrazine spill occurs. It was not known whether competitive chemisorption of water would affect the reaction rate with CuO, but it has now been found that water does not have any appreciable effect on the reduction of cupric oxide by hydrazine.

The overriding consideration in the development of a composition for treating spills, is the temperature rise which occurs upon hydrazine decomposition. The temperature of the pellet must be kept below 52° C., e.g., the flash point of pure hydrazine. For any spill occurrence, the following variables are of interest:

(1) temperature rise
(2) weight percent loading of CuO in a pellet
(3) pore volume
(4) dilution factor of the spill (water to hydrazine ratio)

According to another aspect of the invention, the values for cupric oxide loading, pore volume and dilution factor, are selected such that the temperature rise is limited and the temperature reached upon contacting is below the flash point of the hydrazines., e.g. hydrazine, monomethylhydrazine, unsymmetrical dimethyl hydrazine and mixtures thereof, being neutralized.

Neutralization is achieved in this scheme by drawing the hydrazine into the dry pellet pores using natural surface tension effects where a reaction takes place. The critical design parameter is to control the rate and overall heat of reaction to avoid flashing of the hydrazine(s) since the vapors are explosive in air.

Other applications for the composition are as air filters, gas masks, vapor hoods, blankets for spacecraft, etc. In such cases of low hydrazine exposure levels, water is not necessary and heat is quenched by thermal losses and/or the heat capacity of the Cu/CuO or the support. Preferably a composition is used which is a relatively high surface area porous adsorbent.

BRIEF DESCRIPTION OF THE DRAWINGS

FIG. 4 is a graph showing how the major variables are interrelated, that can be used as a more general guide for selecting the optimal pellet configuration for a given set of spill conditions.

DETAILED DESCRIPTION

Figure 1:
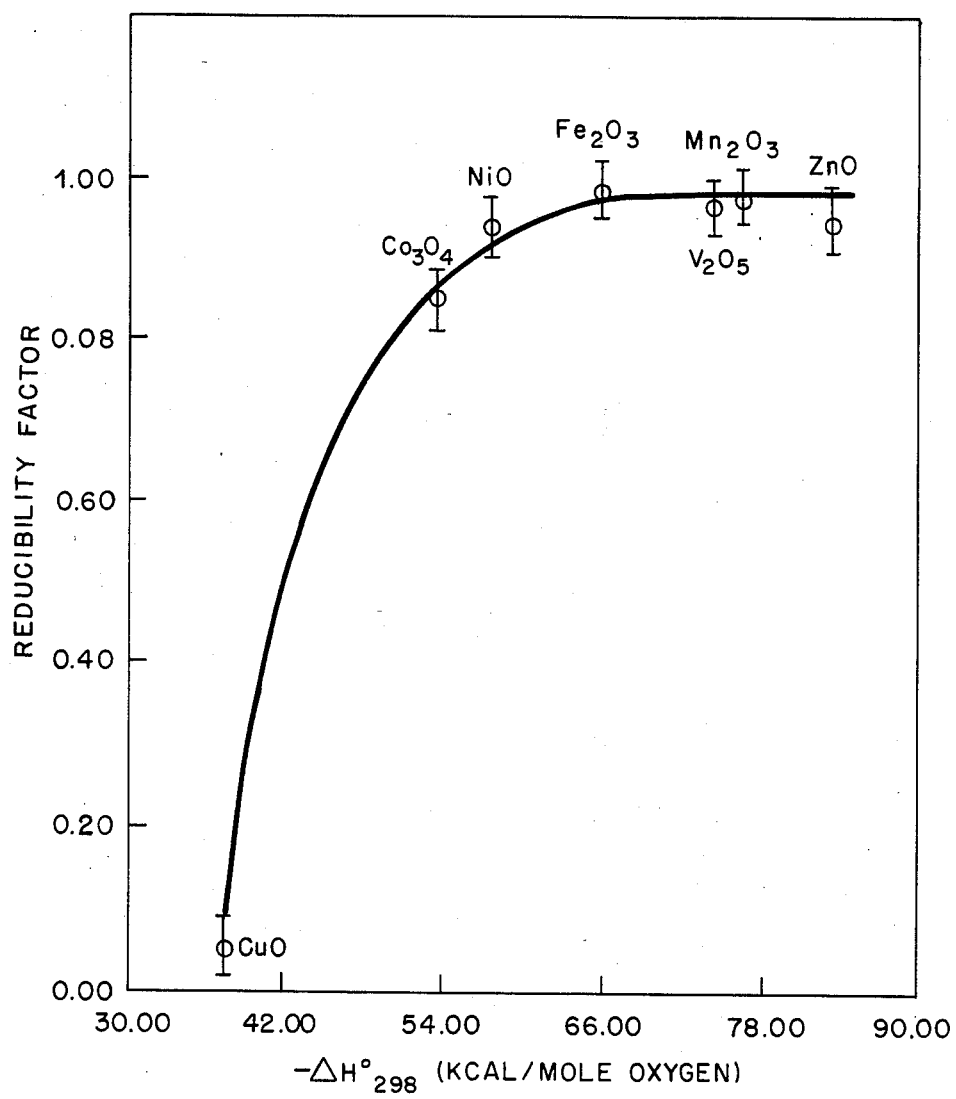
FIG. 1 is a plot showing the ease of reducibility of first row transition metal oxides in hydrazine at room temperature.

The physical and chemical properties of the hydrazines are important in finding a way to render them innocuous.

Table 1 shows a comparison between hydrazine (anhydrous and aqueous) and the two main hydrazine derivatives, monomethylhydrazine (MMH) and unsymmetrical dimethylhydrazine (UDMH).

TABLE 1

| Chemical and Physical Properties of Hydrazines | | | | |
|---|---|---|---|---|
| | Anhydrous | Aqueous | MMH | UDMH |
| Formula | $N_2H_4$ | $N_2H_4.H_2O$ | $CH_3NHNH_2$ | $(CH_3)_2NNH_2$ |
| Melting Point, °F. | 35.6 | −59.8 | −62.3 | −71 |
| Boiling Point, °F. | 236.3 | 248.2 | 189.5 | 147 |
| Specific Gravity @ 25° C. | 1.004 | 1.032 | 0.874 | 0.784 |
| Vapor Density | 1.1 @ 32° F. | 1.59 @ 32° F. | 1.6 @ 68° F. | 2.4 @ 32° F. |
| Flash Point*, °F. | 100 | 162 | 70 | 5 |
| Vapor Pressure (psia) | | | | |
| @ 40° F. | 0.07 | — | 0.31 | 1.0 |
| @ 80° F. | 0.31 | — | 1.0 | 3.1 |
| @ 120° F. | 1.04 | — | 3.1 | 8.4 |

*determined by closed cup (TAG) method

Anhydrous hydrazine is a colorless, fuming liquid that is hygroscopic and has a tendency to absorb carbon dioxide and oxygen from the atmosphere. Since hydrazine is highly polar, it is miscible with polar solvents such as water, alcohols, ammonia, and amines.

The use of hydrazine as a rocket fuel depends largely on its endothermic nature (+12.1 kcal per mole). Hydrazine and its derivatives have endothermic heats of formation and high heats of combustion. Certain metals (e.g., molybdenum, platinum and iridium) significantly lower the decomposition temperature, 250° C., of anhydrous hydrazine. Hydrazine vapors are more dangerous, with the explosive limits in air being between 4.7 and 100 vol%. However, it has been noted that diluents such as nitrogen, helium, and water vapor considerably reduce the explosive range. Anhydrous hydrazine flashes at 52° C., 64% aqueous solution at 72° C., and below a concentration of 40% no flashing occurs. These flash points are measured by the open cup method.

The problems associated with hydrazines stem from the toxic hazards which they pose at spill locations, and also the fact that solid materials at the spill site can catalyze or promote ignition of the spill or detonate hydrazine vapors above the spill.

Hydrazine, $NH_2NH_2$, is the simplest diamine, yet unique because the N—N bond enables it to act as either a reducing or oxidizing agent. The N—N bond has nitrogen in the −2 valence state although nitrogen's natural inclination is to the zero valent oxidation state of the N≡N bond. Since the formation of N≡N gives off nearly six times as much energy as the N—N bond, this reducing action is powerful. Hydrazine will act as an oxidizing agent by splitting the N—N bond; in practice, though, these reactions are usually quite slow. Also, each nitrogen has a pair of free electrons, making hydrazine a Lewis base.

Hydrazine reactions performed at low pressures from 10 to $10^{-8}$ torr reduce many explosive and toxic considerations. Since the generalized reduction reaction:

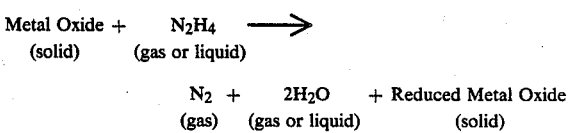

involves a net increase in gaseous moles, the equilibrium of this reaction is not shifted toward reactants with decreasing pressure. Therefore, it is desirable from safety and cost considerations to run trial reactions at low pressures or dilute concentrations prior to advanced testing under simulated spill conditions.

EXAMPLE I

X-ray Photoelectron Spectroscopy (XPS) Measurements After Hydrazine Exposure A set of experiments was conducted at 295K in order to identify those oxides most easily reduced by hydrazine. In these experiments oxide samples were uniformly exposed to ca. $5 \times 10^{-2}$ torr of hydrazine for 30 minutes and the spectra for the exposed material compared with that of the fully oxidized precursor. A reducibility factor (RF), defined as the oxygen to metal ratio of the reduced sample divided by the oxygen to metal ratio of the oxidized sample, was used to compare the relative reducibilities of the oxides as shown in Table 2. Cupric oxide, with a RF of 0.05, was by far the most easily reduced oxide under these conditions.

Extended hydrazine treatments at ca. $10^{-2}$ torr indicated that cupric oxide is reduced to a near metallic state as evidenced by a measured oxygen to metal ratio that approaches 0.01. CuO surfaces exposed to hydrazine at ca. $10^{-6}$ torr could also be reduced to a near metallic state at room temperature.

TABLE 2

Reducibility of Transition Metal Oxides in Hydrazine. Operating conditions: 295K, $5 \times 10^{-2}$ torr at the sample surface.

| Metal | Metal Oxide | Reducibility Factor (RF) |
|---|---|---|
| V | $V_2O_5$ | 0.97 |
| Cr | $Cr_2O_3$, $CrO_2$, $CrO_3$ | 0.90 |
| Mn | $Mn_2O_3$ | 0.98 |
| Fe | $Fe_2O_3$ | 0.99 |
| Co | $Co_3O_4$ | 0.90 |
| Ni | NiO | 0.94 |
| Cu | CuO | 0.05 |
| Zn | ZnO | 0.95 |

RF = (O:Metal) after reduction/(O:Metal) of the oxidized precursor.

The apparent ease of reduction of CuO may be attributed to its relative thermodynamic instability in comparison to the other oxides examined. As shown in FIG. 1, the measured reducibility factor appears to increase in a monotonic fashion with increasing heat of formation per mole of oxygen of the corresponding metal oxide (i.e., $-\Delta H° 298$/mole oxygen).

Without wishing to be bound by theory, Applicants note the following: The thermodynamic driving force for copper oxide reduction by hydrazine apparently results from the water produced during reaction. It has also been pointed out generally that a significant surface kinetic driving force may exist as provided by the strong hydrogen bonding interaction between surface oxygen species and incoming hydrogen-containing species. Since oxide surfaces are known to provide significant levels of acidity, and hydrazine is a strong Lewis base, this interaction could also be viewed in terms of an acid-base interaction. It may be noted that cupric oxide has the greatest acidic characteristics of the oxides examined in Example I.

Reduction kinetics, continuously measured at the surface using in situ XPS at hydrazine pressures of $6 \times 10^{-3}$ torr and temperatures from 295 to 381K, indicated that the reduction of CuO is a first order reaction dependent upon the amount of CuO present in an excess amount of hydrazine.

Preparation of the copper oxide impregnated supports is described in the following:

Pore Decoration with Copper Oxide of Porous Supports

Typical Preparation Method

In a typical process any reasonably porous materials like calcined clays, higher porosity calcined clays, synthetic calcium silicate, silica and alumina can be used.

A. Preparation of stock solution of copper sulfate:

Copper sulfate solution, 1.41M was prepared by dissolving 700 g of copper sulfate pentahydrate in 2000 ml of distilled water with vigorous stirring. The technical grade copper sulfate was obtained from Aldrich Chemicals Company. In all subsequent experiments this stock solution was used. If required the concentration of the stock solution was proportionally adjusted using higher or lower amounts of copper sulfate.

B. Impregnation and Stabilization

Required amounts of copper sulfate solution were added to 50 grams of desired material slowly but with vigorous stirring. The amount of copper sulfate solution used was just enough to fill the pores of supports. For example, 55 mls of copper sulfate solution is required to fill the pores of Alphatex. This process of impregnation is known as incipient wetness method. The material was then dried at 150° C. for 8 hours. The dried material is referred to as porous support inner lined with copper sulfate. The higher loading was achieved by increasing the concentration of the copper sulfate solution or repeating the impregnation and stabilization process. The lower loadings were achieved by application of dilute stock solutions. In many instances higher loadings cannot be achieved simply by increasing the concentration of copper sulfate due to finite solubility of copper sulfate in water, and repeat impregnation is necessary.

C. Precipitation

It was found to be easier to convert copper sulfate into copper oxide via copper hydroxide than direct calcination of copper sulfate lined supports in oxygen. The copper hydroxide was allowed to precipitate in the pores of the support by slow hydrolysis of copper sulfate with a strong base such as sodium hydroxide. In a typical method, the copper sulfate supports, as prepared in method B, were exposed to a strong base, 4 to 12 molar concentration, with vigorous mixing. At this concentration of base, hydroxyl to metal ratios were in the range of 3 to 9, which are sufficient to hydrolyze and precipitate copper hydroxide from copper sulfate. The materials were then washed free of any excess base by repeated washings with distilled water and dried at 150° for 8 hours. The stock solution of strong base, e.g. sodium hydroxide, was prepared by dissolving 505 grams sodium hydroxide in 1000 ml of distilled water. As required, the concentration of stock solution was adjusted by dilution or addition of extra sodium hydroxide to maintain hydroxyl to copper ion ratios of 3 to 9. The process of precipitation can also be carried out with mild bases such as organic bases and carbonates of alkaline metals. However, stronger bases are preferred in order to prevent leaching of copper sulfate out of pores and deposition of copper hydroxides on the outer surface of supports.

D. Calcination to Copper Oxide

The copper hydroxide lined supports prepared in process C were ground to a fine powder with a coffee grinder. The ground powders were calcined at 500° C. for two hours. The calcination time and temperature are sufficient to convert copper hydroxide lined in the pores of support into copper oxide.

Synthesis of high porosity calcined clays

The typical commercial calcined clays can have pore void volume of 0.8 to 1.2 cc/g. A process is described here to prepare a calcined clay of porosity higher than 1.2 cc/g from natural clay mineral kaolinite.

Kaolinite, a layered alumino silicate mineral was beneficiated and classified to 96% less than $2\mu$ according to a general process applied in such mineral processing industries. The clay was spray dried and micropulverized two times. The pulverized clay was calcined to 750° C. for one hour in ceramic crucibles. The product was then cooled and digested with 6M sulfuric acid at 95° C. for 30 minutes, filtered and the process of acid treatment was repeated, total of three times. The final material was washed free of excess acid, dried at 150° C. for four hours and micropulverized one more time. The pore void volume of this material was 1.65 cc/g, measured by water uptake. Copper oxide was deposited in the pores of the above material by the methods described in A to D.

This general process can be used to decorate pores of any porous support. The process can be used to control both the copper oxide loading and pore void volume of the final product by judicious selection of the support and the concentration of the copper sulfate solution.

EXAMPLE II

Preparation of Copper Oxide Lined Alphatex

Alphatex is a commercially available calcined kaolin with pore void volume of 1.2 cc/g. The pore void volume was measured by the Mercury intrusion method. 50 grams of Alphatex was impregnated with 55 mls of 1.41M copper sulfate solution. The copper sulfate Alphatex was dried at 150° C. for 8 hours. This material is referred to as Alphatex-I, where pores are lined with copper sulfate.

Alphatex-I was reacted with 50 mls of 4.0M sodium hydroxide. The resulting paste was diluted with 500 mls of distilled water and then filtered through a Watmann Filter I. The material was washed repeatedly with distilled water to remove excess base to pH=7.0. This material is designated as Alphatex-II, pores lined with copper hydroxide.

Alphatex-II was dried at 150° C. for 8 hours and pulverized with a lab size micro-pulverizer. Alphatex-II then was calcined at 500° C. for 2 hours in a ceramic crucible. This material is designated as Alphatex-III, where pores are lined with copper oxide. The pore void volume of Alphatex-III was 0.87 cc/g with copper oxide loading of 6.4% by weight.

EXAMPLE III

Preparation of Copper Oxide Lined Calcium Silicate

The synthetic calcium silicate, Microcell-E, was obtained from Manville Corporation. The pore void volume, measured by water uptake, was 4.5 cc/g. This material was impregnated with 205 mls of 0.35M copper sulfate solution according to method B. The precipitation method was identical to the one described in process C, however, 200 mls of 1.0M sodium hydroxide was used. The rest of the preparation steps were identical to those described in general methods B to D. The pore void volume of the final product was 2.5 cc/g, measured by water uptake.

EXAMPLE IV

Microgravimetric Studies of Supported Cupric Oxide

A. Purpose of Experiment

A Cahn 2000 microbalance, with a capacity of 1.5 g and an ultimate precision of +0.2 ug, was used in the microgravimetric studies.

A kaolin supported cupric oxide sample (16.5 wt.% CuO), provided by Anglo American Clays, was saturated with water and then exposed to hydrazine. To determine if the cupric oxide was reduced by hydrazine in the presence of water, the final weight of the sample (vacuum at 393K) was compared to the initial weight of the sample (vacuum at 393K).

B. Procedure

The sample was initially saturated by a He carrier gas bubbled through water at 298K. The sample was considered saturated when the weight increase was less than 0.005 mg/h. Vacuum was then applied and the temperature was increased to 393K to remove adsorbed species. When the sample showed no further signs of weight loss the sample was considered to be at its "base weight" to which the final weight of the sample was compared. The sample was again saturated with water; at this time hydrazine was introduced at a partial pressure of 4.2 torr. It should be noted that the $H_2O$/He stream remained flowing during the hydrazine exposure. The weight was monitored as a function of time until it stabilized at which time vacuum was pulled at 393K to remove adsorbed species. The resulting weight was compared to the "base weight".

C. Results

It was found that the supported cupric oxide sample lost weight when initially exposed to hydrazine. When the sample was heated to 393K in vacuum the sample showed a net weight loss as compared to the "base weight". This weight loss of 3.25 mg corresponded to that predicted for total reduction of the cupric oxide to metallic copper metal (3.23 mg). Although it is possible for hydrazine to replace strongly bound water on the surface that would not be removed at 393K, this action would result in a weight increase (1 hydrazine to 1 water) or a very slight decrease (2 waters to 1 hydrazine). This decrease would not be on the order of the observed decrease. Hence, it can be reasonably concluded that the weight loss was due to the reduction of cupric oxide by hydrazine.

The experiment shows that water does not have any appreciable effect on the reduction of cupric oxide by hydrazine. It also shows, by weight difference, that the reduction of cupric oxide by hydrazine goes to copper metal.

Design Parameters for a Neutralization Pellet

The overriding factor in the design of a suitable support for cupric oxide is the temperature rise which occurs upon hydrazine decomposition. The temperature rise caused by neutralization must be such that the ambient temperature is kept below 52° C., e.g., the flash point of pure hydrazine.

The temperature increase within the pellet will depend on several factors such as:
(1) cupric oxide loading,
(2) pore volume of the pellet,
(3) dilution factor of the spill,
(4) heat capacity of the pellet and liquid,
(5) heat losses to the surroundings.

Cupric Oxide Loading

The CuO loading can be adjusted during preparation so that all of the hydrazine drawn into the available pore volume will be reacted. Moreover, the loading must be kept low enough so that liberated heat from the reaction can be quenched and does not cause flashing.

Pore Volume

The pore volume of the pellet can be controlled by fabrication of the proper material. The pore volume should be large enough so that an adequate amount of water can be absorbed to act as a heat sink.

Dilution Factor

The dilution factor, defined as the water to hydrazine ratio, will depend on metal loading and pore volume.

The amount of water added to a spill should lower the hydrazine concentration so that the cupric oxide will be in excess. It is important that the dilution factor be adequate for the pore volume and loading. If too little water is added, the pores will contain unreacted hydrazine after the cupric oxide is spent and/or the temperature rise in the pellet will be excessive.

Heat Capacities

The pellet and liquid within the pore system will be used to absorb the heat generated by the reaction. The greater the heat capacity of the liquid-filled pellet, the lower the temperature rise for a given loading.

Heat Losses

Heat losses to the environment, along with the heat absorbed by the pellet and liquid, will be the major heat sinks in the system. The heat loss to the environment cannot be accurately predicted, since it depends on other factors such as how thick a layer of neutralization pellets is applied, the ambient temperature at the spill site, prevailing air currents, etc.

Although an accurate temperature rise cannot be predicted, the adiabatic temperature rise can be calculated and viewed as an upper limit or the temperature rise which would occur in the absence of heat losses to the surrounding environment. This calculated value can then be compared to experimentally obtained temperature rises for determination of an estimated heat loss. In the adiabatic temperature rise formula, all of the important parameters mentioned above, except for heat losses, are considered.

EXAMPLE V

Temperature Rise Experiments

The temperature rise of a hydrazine/water and supported cupric oxide system was experimentally determined using the following procedure:

1. $N_2H_4$ and $H_2O$ were mixed to the desired dilution level,
2. CuO supported on kaolin was added to the $N_2H_4/H_2O$ mixture in a well insulated reactor,
3. A thermocouple placed in the reaction bed measured the temperature rise.

The $N_2H_4$ and $H_2O$ had a volume of approximately 17.5 ml; 20 g of supported CuO was used with a pore volume of 0.87 cc/gm (found by incipent wetness). This amount of liquid was enough to completely fill the pore volume and not cause excessive wetness. Also, for each experiment an amount of hydrazine was used to completely reduce the CuO in the support. The bed dimensions of the reactant mixture were 2.5 cm in height by 5 cm in diameter. The thermocouple was placed in the middle of the bed 0.5 cm below the surface; this position appeared to be the hottest spot within the bed.

Figure 2:
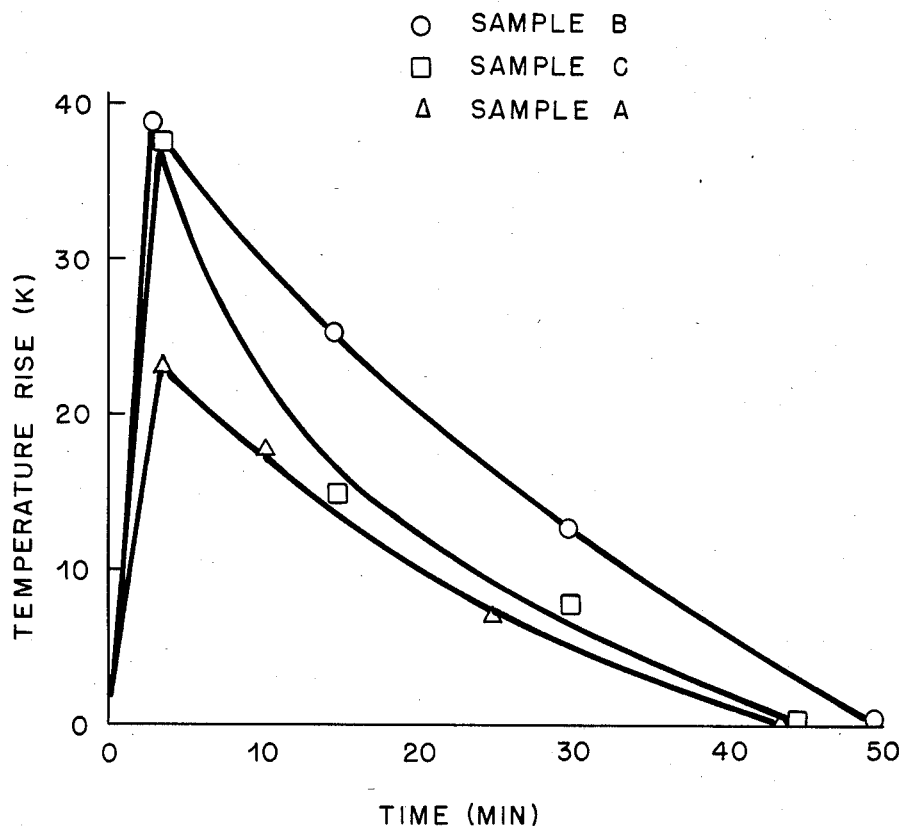
FIG. 2 is a plot of actual temperature rise against time for temperature rise experiments in which the dilution factor was varied.

The results of the experiments are shown in Table 3. The maximum temperature rise for the samples was between 23° and 39° C. (FIG. 2) and the absolute temperatures ($\Delta T + T$ ambient) of the samples was between 50° and 72° C. These temperature rises are roughly half those predicted by an adiabatic temperature rise calculation (Table 3).

TABLE 3

| | | Results of Temperature Rise Experiments | | | | |
|---|---|---|---|---|---|---|
| Sample | CuO Loading % | Actual $\Delta T$ (K) | Adiabatic $\Delta T$ (K) | Grams $N_2H_4$ Oxidized | Dilution | T ambient $+\Delta T$ (K) |
| A | 18 | 23 | 72 | 0.72 | 25 | 50 |
| B | 18 | 39 | 74 | 0.72 | 21.7 | 72 |
| C | 18 | 38 | 75 | 0.72 | 23.6 | 66 |

Adiabatic Temperature Rise Calculation

The adiabatic temperature rise of a reaction within the CuO-support material can be found using the following equation:

$$\Delta T = \frac{-\Delta H M}{M_1 C_{p_1} + M_2 C_{p_2}}$$

where,
$\Delta T$ = Adiabatic Temperature Rise, K
$\Delta H$ = Heat of Reaction, kcal/mole hydrazine
M = Amount of hydrazine reacted, moles
$M_1$ = Mass of pellet, grams
$C_{p_1}$ = Heat capacity of pellet, kcal/gm K
$M_2$ = Mass of liquid, grams
$C_{p_2}$ = Heat capacity of liquid, kcal/gm K The heat of reaction for the reduction of CuO by $N_2H_4$ has been calculated to be $-73.5$ kcal/mole $N_2H_4$ for the equation shown below.

$$2CuO + N_2H_4 \rightarrow 2Cu + 2H_2O + N_2, \Delta H = -73.5 \text{ kcal/mole}$$

According to the conditions used in Sample B (see Table 3), the adiabatic calculation is performed in the following manner. The amount of hydrazine reacted was 0.0226 moles based on the stoichiometry of the reduction equation. The mass of the pellet was 20 grams (18% CuO) and the heat capacity is $\sim 2.5 \times 10^{-4}$ kcal/gm K. The pore volume was determined to be 0.87 cc/gm by incipent wetness. From this number $M_2$ was calculated as $\sim 17.4$ g. $C_{p_2}$ is equal to $\sim 1 \times 10^{-3}$ kcal/gm K. The adiabatic temperature rise for Sample B (Table 3) is:

$$\Delta T = \frac{(-73.5 \text{ kcal/mole}) (0.0226 \text{ moles})}{(20) (2.5 \times 10^{-4}) + 17.4(1 \times 10^{-3})} = 74K$$

An actual temperature rise of 39° K. was observed.

If the fractional temperature rise (actual temperature rise/adiabatic temperature rise) is assumed to be constant for any loading, pore volume, configuration of pellets, etc. then the adiabatic temperature rise equation can be used to get an approximation of the critical design parameters (i.e., loading, pore volume, and dilution factor).

With the aid of the above equation, it is clear that for any spill occurrence there are four variables of interest:
(1) Temperature rise
(2) Weight percent loading of CuO in a pellet
(3) Pore volume
(4) Dilution factor Analysis of the four variables indicates that some are constrained within certain physical limits and others may be eliminated by virtue of the above equation.

Temperature Rise

The temperature rise of the system will be restrained by safety considerations (flash point of hydrazine is 52° C.).

Pore Volume

The pore volume is a free variable that will be fixed when the support material is made.

Loading of CuO

The loading has a constrained value because it must be kept $\geq M$ so that all the hydrazine drawn into the pores will be reacted.

Dilution factor

The dilution factor is fixed because of the degrees of freedom in the above equation and the given restraints (i.e. loading and temperature rise).

Considering the variables discussed above, the equation may be applied to the design of pellets as follows (FIG. 4). For example, a given pore volume and temperature rise (pore volume 1.5 and temperature rise of 35K) specifies the minimum loading to react all of the hydrazine drawn into the pores (12%) and the dilution factor (52) that will insure ample water to provide the proper heat sink and completely wet the pores.

TABLE 4

| CuO Loading (%) per 100 gm support | $N_2H_4$ reacted moles (gms) | Design Parameters T(K) 0.8 cc/gm Pore Volume | 2.0 cc/gm Pore Volume | Without Dilution* 0.8 cc/gm | Dilution Factors 0.8 cc/gm Pore Volume | 2.0 cc/gm Pore Volume |
|---|---|---|---|---|---|---|
| 1 | $6.35 \times 10^{-3}$ (0.20) | 4.4 | 2.1 | 5.5 | 399 | 999 |
| 3 | $1.95 \times 10^{-2}$ (0.62) | 13.6 | 6.4 | 17.0 | 128 | 322 |
| 5 | $3.3 \times 10^{-2}$ (1.06) | 23.1 | 10.8 | 28.8 | 75 | 188 |
| 10 | $6.99 \times 10^{-2}$ (2.24) | 48.9 | 22.8 | 61.0 | 35 | 88 |
| 15 | $1.11 \times 10^{-1}$ (3.55) | 77.7 | 36.3 | 96.8 | 22 | 55 |
| 20 | $1.57 \times 10^{-1}$ (5.03) | 109.9 | 51.3 | 137.0 | 15 | 39 |

*Note that not all of hydrazine in the pore volume will be reacted.

Thus, among the first row transition metal oxides from $V_2O_5$ to ZnO, CuO was found to be the most easily reduced by hydrazine. CuO surfaces exposed to hydrazine at ca. $10^{-6}$ torr could be reduced to a near metallic state at room temperature. Reduction kinetics, continuously measured at the surface using in situ X-ray photoelectron spectroscopy (XPS) at hydrazine pressures of $6 \times 10^{-3}$ torr and temperatures from 295 to 381K, indicated that the reaction was first order with respect to CuO.

Figure 3:
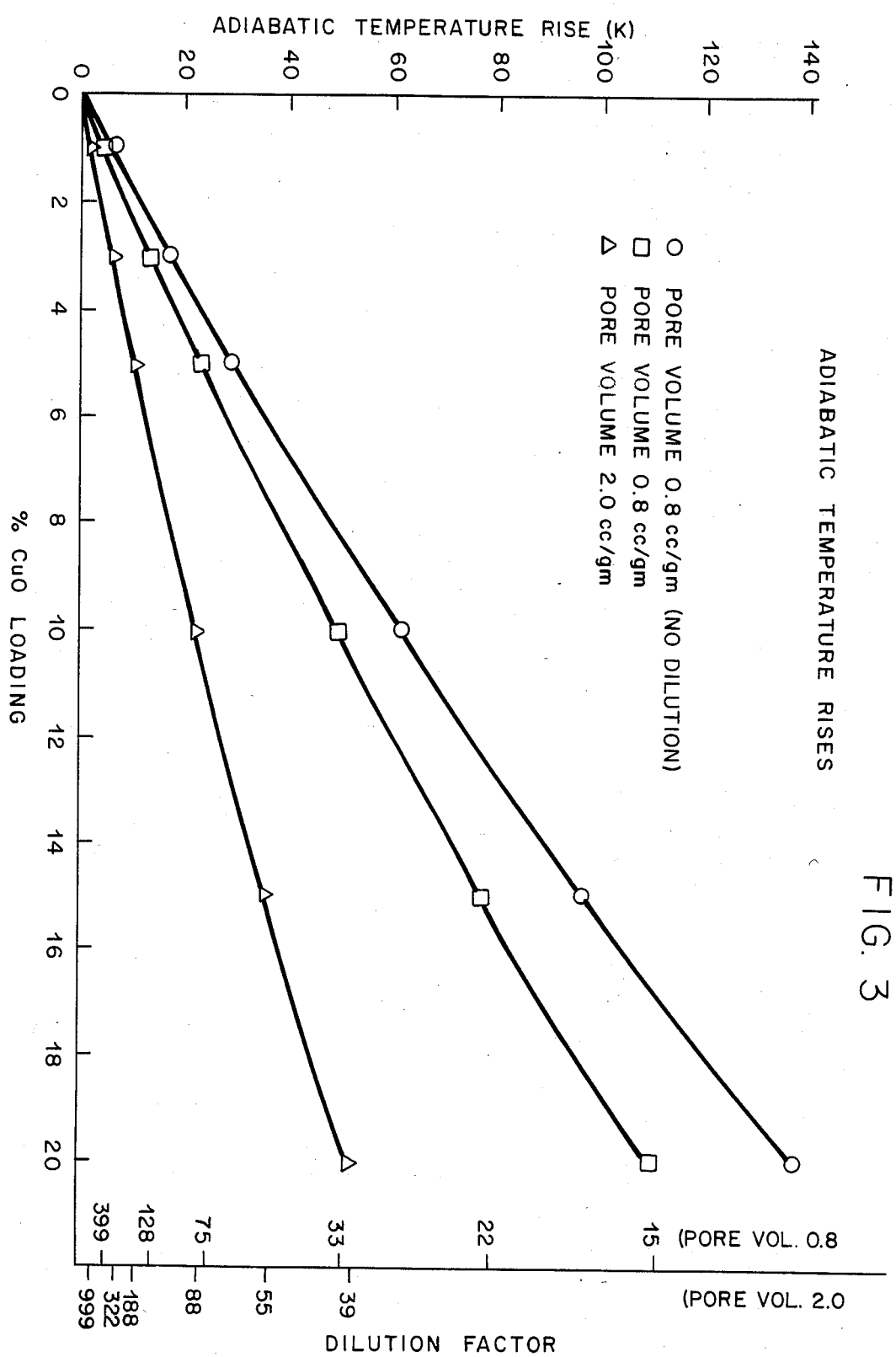
FIG. 3 is a graph based on Table 4, of calculated adiabatic temperature rise with variation of certain design parameters of the composition; and along these lines

The adiabatic temperature rise has been calculated for pore volumes of 0.8 and 2.0 cc/gm (FIG. 3 and Table 4) and for various CuO loadings. Dilution factors were calculated assuming fully wetted pores. As seen in FIG. 3, for a specific temperature rise the 2.0 cc/gm pore volume will allow for a greater loading than the 0.8 cc/gm pore volume. In addition, the dilution factors will be approximately equal. Therefore the largest obtainable pore volume should be used given a temperature rise restraint.

Microgravimetric studies showed that CuO supported on kaolin from Anglo American Clays was reduced by hydrazine in the presence of water. The observed weight loss (3.25 mg) corresponded closely to the predicted weight loss (3.23 mg) for total reduction of the CuO to Cu metal.

Experiments carried out to determine the temperature rise in a bed of supported CuO material, indicate that a correlation between the observed temperature rise and the calculated adiabatic temperature rise exists. The calculated adiabatic temperature rise clearly allows determination of the maximum temperature rise in the absence of heat losses to the environment and is useful for design purposes. The actual temperature rise, using the formula for the adiabatic temperature rise and the effects of critical parameters such as pore volume, loading, dilution factor, can be estimated. These calculations show that, for the necessary temperature rise restraint, supports with large pore volumes ($\geq 2.0$ cc/gm) are needed as suitable substrates for CuO.

What is claimed is:

1. A method for safely decomposing a hydrazine selected from the group consisting of hydrazine, monomethyl hydrazine, unsymmetrical dimethyl hydrazine and mixtures thereof, which comprises contacting the hydrazine with a composition comprising a copper oxide supported on a porous material while maintaining a temperature below the flash point of the hydrazine.

2. The method as set forth in claim 1 in which hydrazine is contacted with the composition.

3. The method as set forth in claim 2 in which the copper oxide is cupric oxide.

4. The method as set forth in claim 2 in which the porous material is selected from the class consisting of silica-containing materials, silica-alumina-containing materials, natural and synthetic zeolites, natural and synthetic mineral clays, metal oxides, carbons.

5. The method as set forth in claim 4 in which the porous material is a kaolin.

6. The method as set forth in claim 2 being applied to hydrazine spills.

7. The method as set forth in claim 6 in which the hydrazine spill is diluted with water before it is contacted with said composition.

8. The method as set forth in claim 2 in which said composition is in the form of pellets.

9. The method for safely decomposing hydrazine which comprises contacting the hydrazine with a composition comprising cupric oxide supported on a porous material, the values for cupric oxide loading, pore volume and dilution of the hydrazine being selected such that the temperature reached upon contacting is below the flash point of the hydrazine.

10. A method for safely decomposing a hydrazine selected from the group consisting of hydrazine, monomethyl hydrazine, unsymmetrical dimethyl hydrazine and mixtures thereof, which comprises contacting the hydrazine with a composition consisting essentially of a copper oxide supported on a porous material while maintaining a temperature below the flash point of the hydrazine.

* * * * *